(12) United States Patent
Mehedy et al.

(10) Patent No.: US 11,061,912 B2
(45) Date of Patent: Jul. 13, 2021

(54) GENERATING PERSONALIZED ROUTES FOR ONE OR MORE USERS TO IMPROVE USER WELL-BEING

(71) Applicant: International Business Machines Corporation, Armonk, NY (US)

(72) Inventors: Lenin Mehedy, Doncaster East (AU); Stefan von Cavallar, Sandringham (AU); Nicholas I. Waywood, Hedelberg Heights (AU)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/334,573

(22) Filed: Oct. 26, 2016

(65) Prior Publication Data

US 2018/0113914 A1   Apr. 26, 2018

(51) Int. Cl.
| | |
|---|---|
| *G06F 16/2457* | (2019.01) |
| *G06Q 50/00* | (2012.01) |
| *G06F 16/248* | (2019.01) |
| *G06F 16/9535* | (2019.01) |
| *G06F 16/9537* | (2019.01) |
| *G06N 5/04* | (2006.01) |

(Continued)

(52) U.S. Cl.
CPC ... *G06F 16/24575* (2019.01); *G01C 21/3484* (2013.01); *G06F 16/248* (2019.01); *G06F 16/9535* (2019.01); *G06F 16/9537* (2019.01); *G06N 20/00* (2019.01); *G06Q 10/04* (2013.01); *G06Q 50/01* (2013.01); *G01C 21/20* (2013.01); *G01C 21/3423* (2013.01); *G06N 5/04* (2013.01)

(58) Field of Classification Search
CPC .............. G06F 16/248; G06F 16/9535; G06F 16/9537; G06F 16/24575; G01C 21/20; G01C 21/3423; G01C 21/3484; G06Q 50/01; G06Q 10/04; G06N 20/00; G06N 5/04

See application file for complete search history.

(56) References Cited

U.S. PATENT DOCUMENTS

| | | | |
|---|---|---|---|
| 8,700,319 B2* | 4/2014 | Kendall | ................. G01C 21/20 |
| | | | 701/433 |
| 9,741,021 B2 | 8/2017 | Yu et al. | |

(Continued)

OTHER PUBLICATIONS

U.S. Appl. No. 14/951,719 filed in the name of S. von Cavallar et al. on Nov. 25, 2015 and entitled "Generating Personalized Routes Incentivized for One or More Users."

(Continued)

*Primary Examiner* — Charles D Adams
(74) *Attorney, Agent, or Firm* — Joseph Petrokaitis; Ryan, Mason & Lewis, LLP

(57) ABSTRACT

A method includes building a well-being profile for a given user based on data obtained from one or more sources associated with the given user. One or more personalized incentives for the given user are identified based on the well-being profile. A personalized route is generated based on the one or more identified personalized incentives, with the personalized route being designed to improve a well-being of the given user. A notification is transmitted to a given client device associated with the given user over a network, with the notification causing the given client device to display the personalized route.

20 Claims, 13 Drawing Sheets

(51) Int. Cl.
*G06N 20/00* (2019.01)
*G06Q 10/04* (2012.01)
*G01C 21/34* (2006.01)
*G01C 21/20* (2006.01)

(56) References Cited

U.S. PATENT DOCUMENTS

| | | | |
|---|---|---|---|
| 10,036,647 B2* | 7/2018 | Barraci | G06F 16/29 |
| 2007/0299599 A1 | 12/2007 | Letchner et al. | |
| 2011/0082007 A1* | 4/2011 | Birrell | A63B 24/0059 |
| | | | 482/8 |
| 2011/0320275 A1 | 12/2011 | O'Sullivan et al. | |
| 2012/0239288 A1* | 9/2012 | Forutanpour | G01C 21/3461 |
| | | | 701/410 |
| 2012/0265433 A1 | 10/2012 | Viola et al. | |
| 2013/0304377 A1* | 11/2013 | Van Hende | G01C 21/20 |
| | | | 701/533 |
| 2013/0304818 A1* | 11/2013 | Brumleve | H04L 67/02 |
| | | | 709/204 |
| 2015/0330800 A1 | 11/2015 | Huyi | |
| 2016/0012194 A1* | 1/2016 | Prakash | G06F 19/00 |
| | | | 705/2 |
| 2016/0171525 A1* | 6/2016 | Ezra | G06Q 30/0225 |
| | | | 705/14.12 |
| 2016/0163826 A1 | 10/2016 | Kangguo et al. | |
| 2017/0039480 A1* | 2/2017 | Bitran | G06F 19/3481 |

OTHER PUBLICATIONS

List of IBM Patents or Patent Applications Treated as Related.
M. Jakob et al., "Personalized Fully Multimodal Journey Planner," External Credit Assessment Institutions (ECAI), 2014, pp. 1225-1226.
B. Yang et al., "Toward Personalized, Context-Aware Routing," The International Journal on Very Large Data Bases (VLDB) Apr. 2015, pp. 297-318, vol. 24, No. 2.
L. McGinty et al., "TURAS: a Personalized Route Planning System," Proceedings of the 6th Pacific Rim International Conference on Artificial Intelligence (PRICAI), Lecture Notes in Computer Science, 2000, pp. 791, vol. 1886.
J. Letchner et al., "Trip Router with Individualized Preferences (TRIP): Incorporating Personalization into Route Planning," Proceedings of the 18th Conference on Innovative Applications of Artificial Intelligence (IAAI), Jan. 2006, pp. 1795-1800, vol. 2.

* cited by examiner

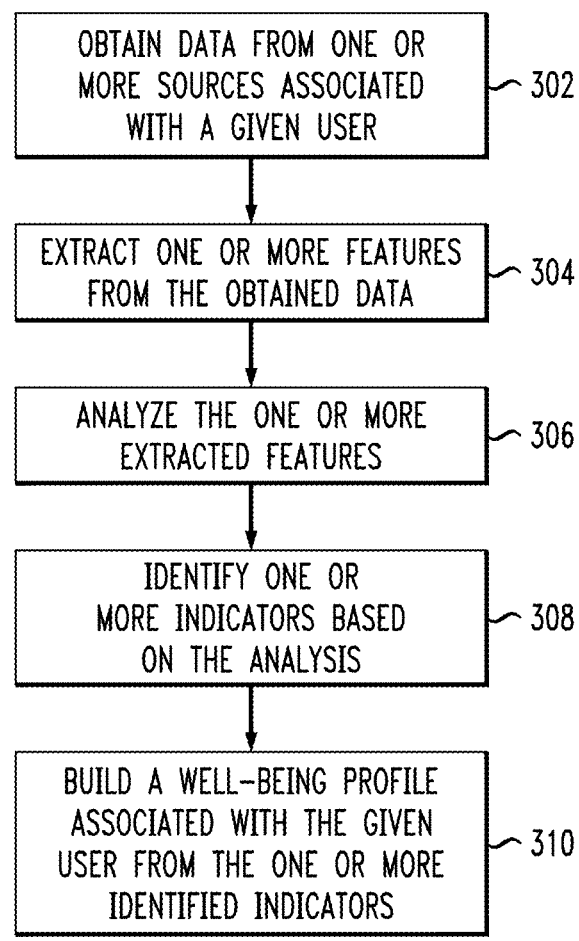

PAST      WELL-BEING PROFILE

SAT 6th FEB      TO FIG. 5 cont.

502

```
{
  "id": "1"
  "timestamp": "2016-02-06 T 11:45",
  "indicator": {
    "type": "emotion",
    "level": {
      "name": "happy"
      "score": 0.73
    }
  },
  "influences": [
    {
      "source": {
        "type": "facebook",
        "url": "http://facebook.com/bob.../"
      },
      "type": "post",
      "data": {
        "timestamp": "2016-02-06 T 10:45",
        "geotag": "Argyle Sq, VIC",
        "text": "Met up with Carol. What a surprise, haven't seen her in ages. We had a great catchup, been such a busy week",
        "media": {
          "type": "image",
          "url": "http://facebook.com/bob/img1.jpg"
        }
      }
    }
  ]
}
```

500

600

700A

700B

GENERATING PERSONALIZED ROUTES FOR ONE OR MORE USERS TO IMPROVE USER WELL-BEING

BACKGROUND

Consideration and integration of personalized information is a growing trend, and is becoming ever more important for determining personalized services. There is an ever-increasing amount of structured and unstructured data that may be associated with a person. As more people use social networks and/or data aggregation services, the richness and value of this data may be utilized to determine various aspects of a person, such as interests. Personalized information may be considered and integrated in the context of, for example, health or well-being. For example, personal well-being (e.g., mental health) can be influenced by simple day-to-day things, such as walking through a park or listening to music.

SUMMARY

Embodiments of the invention provide techniques for the generation of personalized routes that are incentivized for particular users. In particular, embodiments of the invention provide techniques for creating a well-being profile for a given user, and generating personalized routes designed to improve a well-being of the given user based on the well-being profile.

For example, in one embodiment, a method comprises building a well-being profile for a given user based on data obtained from one or more sources associated with the given user. One or more personalized incentives for the given user are identified based on the well-being profile. A personalized route is generated based on the one or more identified personalized incentives, with the personalized route being designed to improve a well-being of the given user. A notification is transmitted to a given client device associated with the given user over a network, with the notification causing the given client device to display the personalized route. The steps of the method are implemented by at least one processing device comprising a processor operatively coupled to memory.

For example, in another embodiment, a computer program product comprises a computer-readable storage medium for storing computer readable program code which, when executed, causes a computer to build a well-being profile for a given user based on data obtained from one or more sources associated with the given user. One or more personalized incentives for the given user are identified based on the well-being profile. A personalized route is generated based on the one or more identified personalized incentives, with the personalized route being designed to improve a well-being of the given user. A notification is transmitted to a given client device associated with the given user over a network, with the notification causing the given client device to display the personalized route.

For example, in yet another embodiment, an apparatus comprises a processing device comprising a processor coupled to a memory, with the processing device being configured to build a well-being profile for a given user based on data obtained from one or more sources associated with the given user. One or more personalized incentives for the given user are identified based on the well-being profile. A personalized route is generated based on the one or more identified personalized incentives, with the personalized route being designed to improve a well-being of the given user. A notification is transmitted to a given client device associated with the given user over a network, with the notification causing the given client device to display the personalized route.

BRIEF DESCRIPTION OF THE DRAWINGS

FIG. 3 depicts a flowchart illustrating an exemplary process for building a well-being profile associated with a given user, according to an embodiment of the present invention.

DETAILED DESCRIPTION

Illustrative embodiments of the invention may be described herein in the context of illustrative methods, systems and devices for generation of personalized routes that are incentivized for one or more users. In particular, illustrative embodiments of the invention may provide for generation of personalized routes associated with improving the well-being of a person, such as mental health. However, it is to be understood that embodiments of the invention are not limited to the illustrative methods, systems and devices but instead are more broadly applicable to other suitable methods, systems and devices.

A route may be defined as a way or course taken in travelling from a starting point to a destination point. Conventional user-centric approaches for route generation suffer from a number of disadvantages. While these user-centric approaches may provide personalized routes or journeys, such solutions typically do not provide adequate motivation to attract and retain potential users. In addition, such solutions typically do not provide functionality which encourages users to take personalized routes that may increase well-being over less enjoyable routes.

An incentive may be defined as something that motivates or encourages the performance of an action. Some embodiments of the invention incorporate one or more incentives into personalized route planning in order to motivate users to join and continue use of a system for personalized routing. The use of incentives can also provide a number of other advantages, including, by way of example, increasing revenue for a system for personalized routing, promoting healthier lifestyles, integrating social media information for route planning, providing businesses, governments and other entities with a channel, via the incentives, for advertising and bringing commerce into an energy and transportation domain, etc. Some embodiments integrate mobile, cognitive, social, cloud and other analytics to provide personalized routing services with incentives tailored for particular users.

Figure 1:
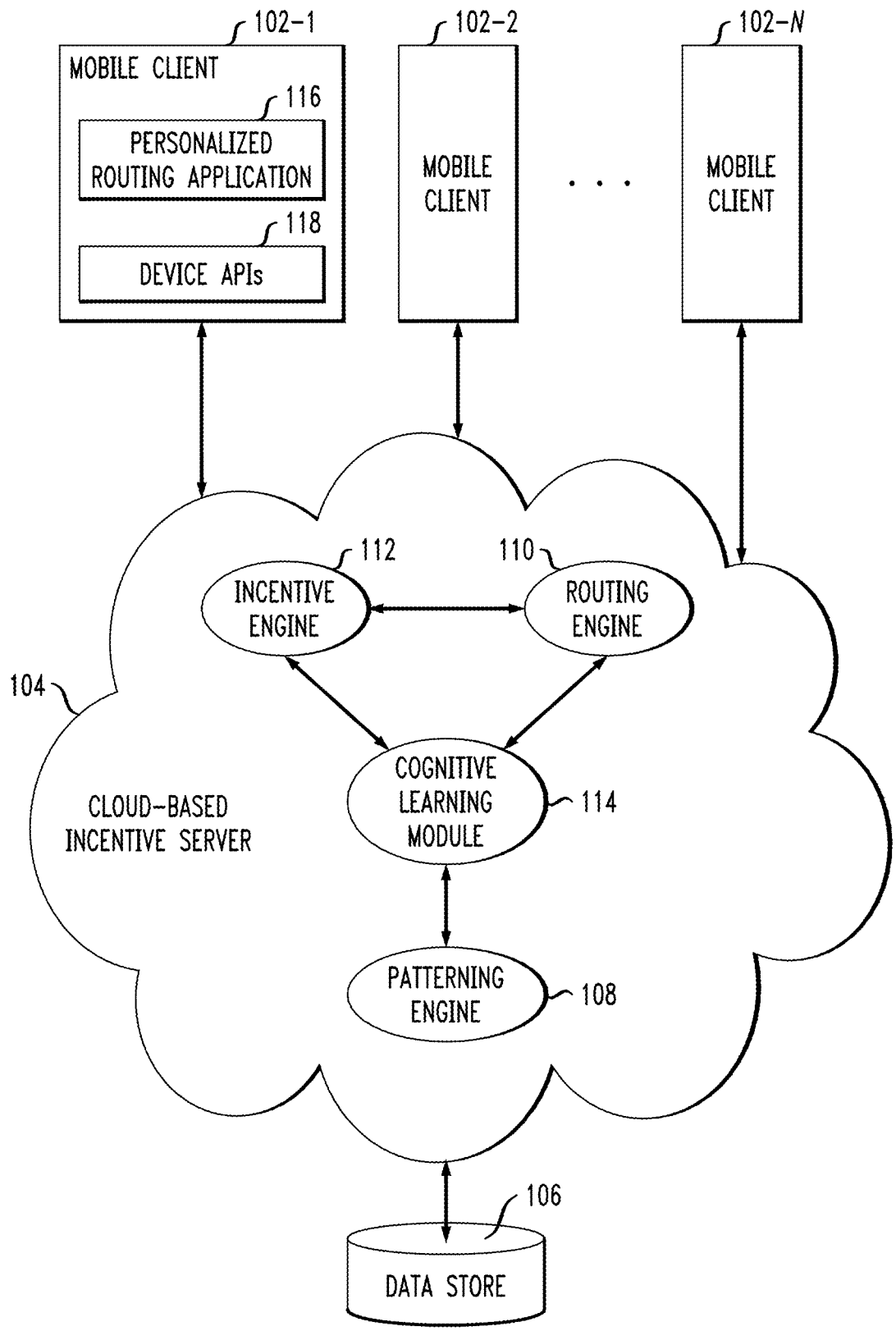
FIG. 1 depicts a system for generating personalized routes incentivized for one or more users, according to an embodiment of the present invention.

FIG. 1 shows a system 100 for generating personalized routes incentivized for one or more users. As shown, the system 100 includes a number of mobile clients 102-1, 102-2, . . . , 102-N which are configured to communicate with cloud-based incentive server 104 for personalized and incentivized routing services. The cloud-based incentive server 104 collects data from various sources, shown as data store 106 in FIG. 1, for use in various analytics relating to generation of personalized routes incentivized for particular users. The cloud-based incentive server 104 may itself be a collection of multiple computing devices or servers. For example, the different engines and modules of the cloud-based incentive server 104, which will be described in detail below, may be provided by different servers or other computing devices in one or more multiple clouds. In addition, it is to be appreciated that embodiments do not require use of clouds or cloud-based servers. For example, in some embodiments that various engines and modules of the cloud-based incentive server 104 may be implemented in a server which is not cloud-based.

Data store 106 may be, by way of example, a social data source such as one or more social media platforms. The data store 106 may additionally or alternatively be a database or other repository of business incentives, social incentives, manual input and user history, information derived or otherwise obtained from social media, etc. Although FIG. 1 shows only a single data store 106, embodiments are not so limited. In other embodiments, the cloud-based incentive server 104 may collect and exchange data with multiple distinct data stores or other data sources.

Cloud-based incentive server 104 collates the information from data store 106 to build user models for particular users or groups of users and to identify user preferences or patterns for generating personalized routes or journeys as well as incentives for such personalized routes. For example, collated preferences may be used to identify patterns in a user's travel activities and social profile to generate one or more personalized route suggestions in the patterning engine 108. For example, the one or more personalized route suggestions may include incentives to increase the well-being of the user. As will be discussed in further detail below, the one or more personalized routes for a given user may be based not only on information specific to the given user but also from information of similar users or friends or other users associated with the given user (e.g., other individuals within the given user's social network). In addition, a personalized route or portion thereof may be generated for a group of users collectively or on a per-user basis. Pattern identification and user profiling and modeling may be achieved through cognitive learning algorithms as will be discussed in further detail below.

In some embodiments, the incentives are not directly related to a personalized route. The incentives may be decoupled from the personalized route in that the incentives are offered based on factors that are not necessarily dependent on the route. As an example, cloud-based incentive server 104 can offer an incentive in the form of a given user receiving a free or discounted pizza because it has analyzed the given user's social network and learned that the given user enjoys pizza. This incentive, however, may be offered purely or primarily to persuade the given user to take an alternative travel route that would achieve an unrelated goal such as minimizing congestion or providing a route that is more aesthetically pleasing for the given user.

As shown in FIG. 1, mobile clients 102 are configured for communication with the cloud-based incentive server 104 over one or more wireless networks for personalized routing and incentive services. Mobile clients 102 may be cellular phones, tablets, smartwatches, etc. making the system for personalized routing and incentive services easily accessible regardless of a location of a user. Embodiments, however, are not limited solely to arrangements in which mobile clients communicate with cloud-based servers. Instead, other embodiments may include other types of clients, such as desktop clients, also configured for communication with the cloud-based servers over one or more wired and/or wireless networks. For example, in some embodiments a user may register to receive personalized and incentivized routing services via a desktop client, but choose to receive notifications regarding incentivized personalized routes at one or more mobile clients which the user has access to.

Mobile clients 102 communicate with routing engine 110 of the cloud-based incentive server 104 in order to receive personalized and incentivized routes for users of the mobile clients 102. FIG. 1, for example, shows mobile client 102-1 having a personalized routing application 116 and device application programming interfaces (APIs) 118 to facilitate communication with the cloud-based incentive server 104. Although not specifically shown in FIG. 1, one or more other ones of the mobile clients 102 may also include personalized routing applications and/or device APIs for facilitating communication with the cloud-based incentive server 104.

The routing engine 110 can utilize pattern information from the patterning engine 108 as well as incentives from the incentive engine 112 in order to generate an incentivized personalized route for a given user (e.g., an incentivized personalized route to increase the well-being of a given user). Some embodiments of the invention incorporate incentives into personalized route planning in order to motivate users to join and continue use of a system for personalized routing. The use of incentives can also provide a number of other advantages, including by way of example increasing revenue for a system for personalized routing, promoting healthier lifestyles, integrating social media information for route planning, providing businesses, governments and other entities with a channel, via the incentives, for advertising and bringing commerce into an energy and transportation domain, etc. Some embodiments integrate mobile, cognitive, social, cloud and other analytics to provide personalized routing services with incentives tailored for particular users.

Some embodiments of the invention incorporate incentives into personalized route planning in order to motivate users to join and continue use of a system for personalized routing. The use of incentives can also provide a number of other advantages, including by way of example increasing revenue for a system for personalized routing, promoting healthier lifestyles, integrating social media information for route planning, providing businesses, governments and other entities with a channel, via the incentives, for advertising and bringing commerce into an energy and transportation domain, etc. Some embodiments integrate mobile, cognitive, social, cloud and other analytics to provide personalized routing services with incentives tailored for particular users.

Each of the patterning engine 108, routing engine 110 and incentive engine 112 may exchange information with one another and utilize cognitive learning module 114 in generating the personalized incentivized route. For example, incentives may be matched to personalized routes through the use of cognitive learning algorithms implemented in the cognitive learning module 114, which itself may utilize social data and user models constructed in the patterning engine 108. As an example, incentives may be matched for promotion of users' activities and achievements through gamification and social networks.

Various businesses, governments and other entities or enterprises may utilize incentives to achieve various goals. The incentive engine 112 may, in some embodiments, utilize business incentives. Businesses may be motivated to offer incentives through the incentive engine 112 for a variety of reasons. For example, incentives having a monetary value may be considered valuable by users, while businesses in exchange may receive increased brand reputation or recognition. Businesses can also use incentives to attract and target new customers, as well as retain existing customers, in an efficient manner. Businesses may also offer incentives to increase their brand recognition and/or reputation, as well as to generate revenue streams.

As will be described in further detail below, incentives may be organized into a hierarchy, repository, database or other data store such as data store 106 for use by the incentive engine 112 of the cloud-based incentive server 104. More generally, the system 100 contains or has access to a collection of incentives, which may comprise products, services, etc. submitted by participating incentive sources such as businesses, governments, clubs, groups or other entities or enterprises. Cognitive learning module 114 utilizes cognitive learning algorithms to match incentives to appropriate users based on user models whose construction and representation is the result of analyzing components such as user preferences, social media information, travel history, etc. Incentive engine 112 may thus be tightly coupled to other components of the cloud-based incentive server 104, including the routing engine 110, such that incentives are directly integrated into personalized routes for users.

The incentive engine 112 may offer incentives based on user interests, likes or other preferences using a gamification strategy. For example, users may be rewarded for accepting and following incentivized personalized routes to earn greater incentives or to unlock incentives in successive levels of a defined hierarchy. Incentive engine 112 can integrate incentives with personalized routes by tailoring the routes based on user interests or likes to direct users to areas where incentives may be claimed. As will be described in further detail below, various contextual parameters may be utilized by the incentive engine 112 in deciding which incentives to integrate into particular personalized routes. Incentives, and personalized routes generally, may also be generated by the cloud-based incentive server 104 based on journeys or routes of friends or other users associated with a given user such that portions of the personalized routes for two different users that are friends or otherwise connected will overlap with one another for at least a portion of the respective routes.

Social incentives are a useful feature provided by the incentive engine 112. Social incentives can be derived from social interactions, such as sharing on social media, liking, reviews and other feedback. Competition or collaboration with friends or other related users can be pivotal for customer retention and attracting new users. System 100, via cloud-based incentive server 104, can leverage social media as a source of input for building personalized user models, routes and incentives. Such information may be utilized to identify personal attributes, patterns of user behavior, route attributes and incentives. For example, such information may be used to find incentives from incentives sources with a degree of similarity to one or more of the user's interests, preferences, preferred locations, etc. Incentive engine 112 may also take into account information such as location reported by a mobile client, frequency analysis in travel history or of social media actions, text analytics of reviews or comments, etc.

System 100 is configured to create a personalized profile for a given user based on data, such as data mined from the given user's social network. In one embodiment, the personalized profile is created from the identification of one or more indicators within content of various media. The one or more indicators may be mined from social media posts, such as timestamp data and geotag data. The one or more indicators may be further derived from social media data content via, for example, sentiment analysis for text, feature/object detection from images and videos, audio/voice analysis of video/audio clips, etc. The one or more indicators may be further derived from sensor data, such as active GPS location, heart rate sensor, and other data that may be obtained from a wearable device. The one or more indicators may be further derived from locality-specific data, such as from public events (e.g., live music performances).

A collection of these indicators, over time, forms a richer social profile that is able to include and represent the well-being of a given user (i.e., a well-being profile). This well-being profile may then be used as additional input into one or more processes to generate personalized routes incentivized for one or more users (e.g., cognitive algorithms). For example, system 100 may be configured to augment, or completely change, an originally proposed route to generate a proposed incentivized route that incorporates the well-being profile(s) of one or more users.

Figure 2:
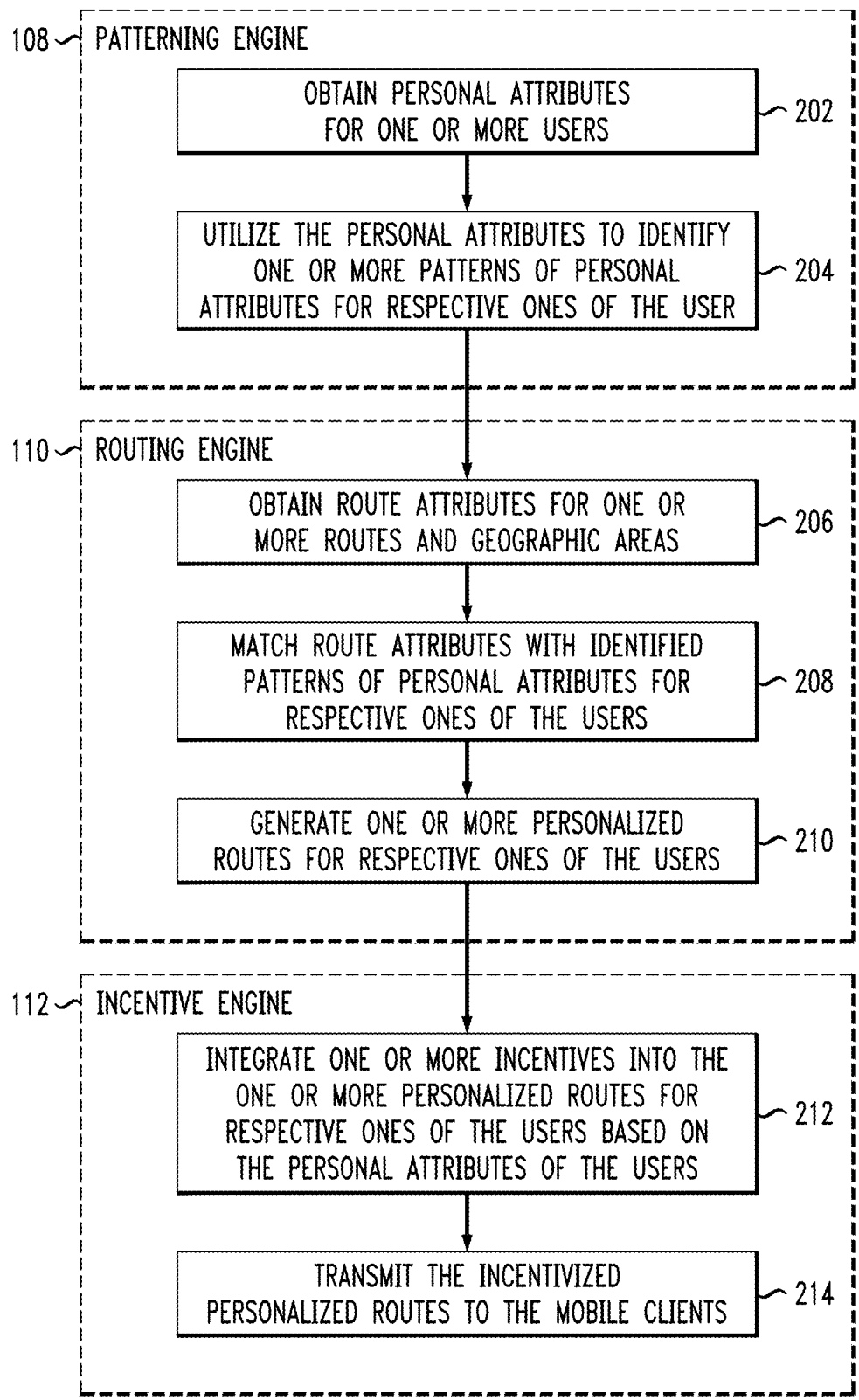
FIG. 2 depicts an example of processing performed in the cloud-based incentive server of the FIG. 1 system, according to an embodiment of the present invention.

FIG. 2 shows an example of processing operations which may be performed by the patterning engine 108, routing engine 110 and incentive engine 112. Patterning engine 108 obtains personal attributes for one or more users in block 202. The personal attributes for a given user may take various forms. For example, personal attributes may include transportation preferences such as preferring biking over walking, the use of buses over subways or trains, etc. Personal attributes may also include various lifestyle attributes, such as desired levels of physical activity or food choices. A particular one of the mobile clients 102 for a given user, by way of example, may include one or more fitness tracking features or applications. The given user may set a target goal such as a number of steps to take each day, total distance traveled, calories burned, times of elevated heart rate, etc.

Various personal attributes, such as food choices, may be specified by a given user or may be learned through past behavior. The cognitive learning module 114, for example, may take input from data store 106 such as social media postings and other information to learn the likes and dislikes of a given user. Cognitive learning module 114 may take input from data store 106 in learning various other personal attributes for a given user, such as the above-mentioned transportation preferences or preferences relating to preferred people, places and locations. For example, the cognitive learning module 114 may utilize social media postings or other social data, purchase histories, etc. to identify preferred businesses or types of products.

Patterning engine 108 utilizes the personal attributes to identify one or more patterns of personal attributes for respective ones of a plurality of users in block 204. Various types of patterns may be learned using cognitive learning algorithms implemented in the cognitive learning module 114. For example, the one or more patterns may indicate an activity that would increase the well-being of a given user. An activity that may increase the well-being of a given user may be, for example, an activity that may improve the mental health of the given user.

A given user may be clustered with one or more other users having similar personal attributes. Using such clusters, patterns may be identified. For example, a cluster of users that prefer a healthy lifestyle and biking as a mode of transportation may also like to drink kale shakes. Patterns may also be identified by mining social data of friends or acquaintance of a given user in addition to or as an alternative to the above-noted clustering approach.

In some embodiments, the processing in blocks 202 and 204 implemented by the patterning engine 108 may involve building a user model by mining social networks of a given user. Building the user model may include creating a graph network of actions of the given user and other ones of a plurality of users based on data obtained from mining the social networks of the given user. To identify patterns of personal attributes, the graph network may be traversed utilizing various graph algorithms. As an example, graph query languages such as Cypher or Gremlin may be used. The graph network may use the Resource Description Framework (RDF) format and utilize an RDF query language such as SPARQL or another semantic query language. It is to be appreciated that the above query languages are presented by way of example, and that embodiments are not limited solely to use with the particular graph types, formats and query languages listed above. Instead, various other graph types, formats and query languages may be utilized in other embodiments.

Various types of search algorithms may be used for identifying patterns based on the graph network. As an example, a breadth-first search (BFS) algorithm may be used to implement the following example query:

MATCH (UserA)→(UserB)—[LIKES]→(UserB. Achievement)
    WHERE UserA.username EQUALS currentUser
    RETURN UserB.Achievement Various other search algorithms may be used, such as but not limited to depth-first search (DFS) algorithms.

Graph queries may also be utilized to learn or obtain the personal attributes for a given user. A sample query is presented below for obtaining a preferred transportation mode for a given user:

MATCH (UserA)→(Transport)
    WHERE UserA.username EQUALS currentUser
    WITH COUNT(Transport.mode) AS numUsedTransportMode
    RETURN MAX(numUsedTransportMode)

The above query may be modified to learn other preferred personal attributes for the given user, or to learn route attributes as will be discussed below.

The routing engine 110 in block 206 obtains route attributes for one or more routes and/or geographic areas. For example, the routing engine 110 may receive input, either direct input from a user via one of the mobile clients 102 or through learning via travel history in data store 106, regarding the sources and destinations for routes taken by different users. The sources and destinations may be used to define a geographic area to limit the search for route options as well as to obtain relevant traffic, weather and other information that may affect generation of personalized routing.

Route attributes, similar to the above-described personal attributes, are varied. Route attributes may include, by way of example, bike paths, walking paths, public transportation lines or paths, roads, etc. Route attributes may also include information such as points of interest locations along paths between sources and destinations. The route attributes may be obtained from a database or other repository in data store 106, or may be learned by mining social networks and other sources utilizing cognitive learning module 114.

Route attributes may be affected by other information such as relevant traffic or weather data. For example, weather data may be obtained for a geographic area covering paths between a source and a destination, or for particular locations between the source and the destination. Route attributes may be adjusted based on weather data. For example, if it is raining or snowing, bike or walking paths may be indicated as unavailable or subject to constraints. Similarly, live traffic data may be obtained for a geographic area covering paths between the source and the destination, or for particular locations between the source and the destination. Route attributes may also be adjusted based on the live traffic data. For example, if a particular subway line, bus route, walking path, bike path, road, etc. is under construction or subject to delays, this may affect the route attributes which are used in generating personalized routes as well as the incentives offered as will be described in further detail below.

In block 208, the routing engine 110 matches route attributes with identified patterns of personal attributes for respective ones of the users. This matching may be done so as to optimize preferences of a given user. For example, if the personal attributes indicate that the given user's preferred mode of transportation is by bike, the routing engine 110 may match route attributes which complement biking as the mode of transportation. Graph networks and graph queries may be utilized for matching route attributes with the identified patterns of personal attributes. A sample query is presented below for obtaining a route with attributes complementing a preferred mode of transport for a given user:

MATCH ARRAY(RouteSegment) as Route, (UserA)
    WHERE RouteSegment.transportMode EQUALS UserA.transportModePreference
    AND RouteSegment.startLocation WITHIN RANGE (<lat>,<lon>,<radius>)
    AND RouteSegment.endLocation WITHIN RANGE (<lat2>,<lon2>,<radius2>)
    RETURN Route The above query may be modified to obtain a route based on various other attributes for the given user.

In block 210, the routing engine 110 generates one or more personalized routes for respective users. In block 212, the incentive engine 112 integrates one or more incentives into the one or more personalized routes for respective ones of the users based on the personal attributes of the users. Integrating incentives into the personalized routes may include mapping social media activity of a given user, and possibly other users associated with the given user, to determine a set of preferred products, places, locations, etc. The incentives for the given user may then be selected from a database of incentives, where the selected incentives are linked in some way to the set of preferred products, places, locations, etc. as well as other personal attributes and route attributes. In this manner, incentives may be used to encourage a user to utilize an incentivized route over another route by aligning incentives with known user preferences, personal attributes, or route attributes. Several examples of incentives are provided below. It is to be appreciated, however, that embodiments are not limited solely to use with the specific incentive examples given below. Instead, various other incentives may be used in embodiments, including combinations of and modifications of the specific examples presented below:

Consider a user whose preferences indicate that they enjoy coffee. An incentive linked to this preference may be a coupon, deal or reward for visiting a coffee shop between a source and destination of a personalized route. To integrate this incentive, the personalized route is modified such that it passes by the location of the coffee shop.

Consider a user whose preferences indicate a healthy lifestyle. An incentive linked to this preference may be to visit a farmer's market or another healthy eating establishment. Again, the personalized route may be modified such that it passes by the location of the farmer's market or other healthy eating establishment to integrate this incentive.

Consider a user whose preferences indicate that walking is a preferred mode of transportation. An incentive linked to this preference may be a business that is located along a walking path which would not normally be part of the route between the source and the destination. The personalized route may be modified to use the walking path based on some type of coupon, deal, reward or other incentive associated with the business that is along the walking path.

Consider a user whose social media activity indicates that various friends or other acquaintances are part of a particular gym, club or group. Incentives linked to such sources may include coupons, deals, rewards or other incentives for visiting the gym, club or group. The personalized route may be modified to integrate such incentives to pass by or stop at the gym, club or group.

Consider a system having a goal of reducing traffic congestion. Incentives linked to this goal may include designing a route that utilizes only public transportation rather than personal vehicles. To encourage the use of such a route, incentives may be used such as discounted prices on public transportation, coupons or rewards for businesses near public transportation stops, etc.

Consider a first user having a first personalized route between a source and destination with a portion thereof that intersects with or is close to a portion of a second personalized route for a second user. If the first and second user are friends or otherwise connected on social media or by similar profiles and interests, the incentive may be to meet at a location which is close to or on one or both of the first and second personalized routes so that the first and second users can meet one another. The incentive may include a coupon, deal, reward or other incentive for visiting a business at the location close to or on one or both of the first and second personalized routes. In some embodiments, the incentive may be competitive between the first and second user. For example, the incentive may indicate a coupon or reward that will be given to the first of a group of users to reach a particular destination. Continuing the above scenario, the reward or coupon may be given to either the first user or the second user based on which of these users reaches the location of the incentive first.

As discussed above, the incentives may be selected from a database or repository of incentives. Businesses or other entities may register as incentive sources with the cloud-based incentive server 104 so as to add possible incentives to the database of incentives. Businesses or other entities, however, need not necessarily add possible incentives to a database. Instead, a business or other entity may register as an incentive source so that the cloud-based incentive server 104, via the incentive engine 112, may suggest incentives for use in generating incentivized personalized routes for a plurality of users.

In some embodiments, the incentives in the incentive database may be organized into a hierarchy of multiple incentive levels. Different users that have registered with the cloud-based incentive server 104 may be assigned different incentive levels. The personalized incentives selected for such users may be determined by matching the incentive level of the user to an incentive level in the hierarchy. Users may be assigned to different incentive levels based on rewards earned for past activity. As an example, a given user may earn rewards by utilizing incentivized personalized routes provided by the cloud-based incentive server 104. In some embodiments, the incentives offered by respective incentive source may be organized into different hierarchies of incentive levels. In other embodiments, the incentives offered by the incentive sources may be organized collectively rather than individually.

The incentive engine 112 may, in some embodiments, utilize contextual information for selecting the incentives to utilize for a particular personalized route. Contextual parameters may include, by way of example, time of day, travel purpose, the destination of the personalized route, etc. If the time of day for a given personalized route does not match with the business hours of a particular incentive source, incentives offered by that incentive source would not be selected for the given personalized route. Alternatively, if the time of day for the given personalized route coincides with on or off-peak hours of an incentive source, the amount of the incentive may be adjusted accordingly. For example, if a restaurant has certain busy times, the amount of a coupon offered as an incentive during such busy times may be relatively low in comparison to the amount of the coupon offered as an incentive during slow times.

Travel purpose or the destination of the personalized route may also affect the incentives offered. For example, if the destination of a particular personalized route is a restaurant, incentives may not be selected for incentive sources that are also restaurants or eateries. If the travel purpose is a road trip to, for example, a beach, incentive sources may be selected which offer to-go food or beverages which may be brought to the beach.

Incentive engine 112, in block 214, transmits the incentivized personalized routes to the mobile clients 102. Transmitting the incentivized personalized route to a given mobile client such as mobile client 102-1 may, in some embodiments, include transmitting a notification to the mobile client 102-1. The notification may be transmitted over one or more wireless networks to mobile client 102-1, and utilize device APIs 118 of the mobile client 102-1 to initiate one or more functions of personalized routing application 116. For example, transmission of the notification may cause the mobile client to display some sort of indication that a new incentivized personalized route is available and provide a selectable link or other user interface feature permitting the user to initiate download of the incentivized personalized route from the cloud-based incentive server 104 to mobile client 102-1. As another example, the notification itself may also include the incentivized personalized route such that selection of the link or other user interface feature causes display of the incentivized personalized route on the mobile client 102-1.

In some embodiments, the personalized routing application 116 provides user interface functions permitting a user of the mobile device 102-1 to register with the cloud-based incentive server 104 to receive incentivized personalized routes, or to request a particular personalized route between a source and a destination. Device APIs on the mobile client 102-1 may be used to select a current location of the mobile client 102-1 as the source of such a request, utilizing location sensors such as Global Positioning System (GPS) sensors of the mobile client 102-1. Cellular or other wireless networking information may also or alternatively be utilized by the device APIs to determine a current location of the mobile client 102-1 to utilize as the source for the personalized route. In other embodiments, the user interface features of the personalized routing application 116 permit the user to specify the source as well as the destination for a requested personalized route.

User interface features of the personalized routing application 116 may also allow a user of the mobile client 102-1 to specify preferred categories of incentives, to request information about how the incentives affect a particular personalized route, to provide feedback on the incentives provided in one or more incentivized personalized routes, etc. Such information may be fed back to the cloud-based incentive server 104 over one or more wireless networks, possibly utilizing device APIs 118.

Information about how incentives affect particular routes may include, by way of example, indications of the time or distance added to a particular route by incentives. For example, if an incentive for a personalized route causes the use of a particular path which is ¼ mile longer, this information may be displayed to the user via the personalized routing application, either as a distance measure, an expected time to travel (e.g., 5 extra minutes), or both. Feedback information may be explicit, such as the user giving a numerical or other type of rating (star rating, like/dislike) to particular incentives. Feedback information may also be gathered based on a user accepting or rejecting, or using or not using, a particular incentivized personalized route without requiring the user to explicitly rate particular incentives. Cloud-based incentive server 104 can utilize such information in machine learning algorithms implemented by the cognitive learning module 114 so as to improve the generation of personalized routes as well as the selection of incentives to integrate in personalized routes.

The system described in FIGS. 1 and 2 may be configured to receive, as additional input, a well-being profile for a given user to improve the physical and/or mental well-being of the given user (or a group of users). For example, the well-being profile may be used to modify or augment the selection of proposed incentivized routes by factoring in the well-being of the given user (or group of users).

With reference to FIG. 3, flow chart 300 is provided illustrating a process for building a well-being profile for a given user, according to an embodiment of the present invention. At step 302, data is obtained from one or more sources associated with a given user. In one embodiment, the obtained data comprises social media data obtained from one or more social media networks associated with the given user. For example, the obtained data may comprise social media activity data. The social media activity data may comprise textual data, timestamp data, geolocation data (e.g., geotag), content data (e.g., textual data, image data and video data), etc. In one embodiment, the obtained data comprises data obtained from one or more communication services. For example, the obtained data may comprise messages sent via one or more instant messaging programs. In one embodiment, the obtained data comprises data obtained from personal medical record(s) associated with the given user. For example, the personal medical record(s) may provide information regarding health of the given user. In one embodiment, the obtained data comprises data obtained from one or more sensors. For example, the obtained data may comprise data obtained from one or more wearable electronic devices comprising one or more sensors configured to obtain data associated with the given user, including but not limited to active GPS location data, heart rate sensor data, etc. In one embodiment, the obtained data comprises locality specific data (e.g., music, festival and other public event data).

At step 304, one or more features are extracted from the obtained data. The one or more extracted features may include, for example, text, geolocation metadata (e.g., geotag), an image, etc. At step 306, the one or more extracted features are analyzed and, at step 308, one or more indicators are identified based on the analysis. In one embodiment, the one or more indicators may comprise one or more of time identified from the timestamp data, location identified from the geolocation data, one or more indicators identified based on an analysis of the content data, well-being indicators of connected friends on one or more social networks associated with the given user, one or more indicators identified based on the sensor data and locality specific data, etc.

For example, a sentiment analysis may be performed on one or more keywords found in text extracted from social media data content that may indicate a confidence score (e.g., an identification of keywords "surprise" and "happy" from a sentiment analysis may result in a high confidence score for use in building the well-being profile). As another example, a spatial analysis may be performed on the geolocation metadata attached to the obtained data to determine a confidence score associated with a location (e.g., it may be determined that there is a high confidence score in whether a location associated with a social media posting is indoors or outdoors). Further details regarding the analysis and identification of indicators will be discussed herein with reference to FIGS. 4A-4C. Accordingly, one or more identified indicators may be derived for a data from a social network associated with the given user.

At step 310, a well-being profile associated with the given user is built from the one or more identified indicators. In one embodiment, building the well-being profile comprises updating a previously built well-being profile associated with the given user. That is, over time, a collection of indicators may form a richer well-being profile that includes and represents the "well-being" of the given user. In one embodiment, the well-being profile is representative of one or more temporal and geospatial factors. The well-being profile may be used as an input data source itself for creating, deriving or otherwise processing personalized data. In one embodiment, multiple well-being profiles may be used in combination to obtain additional indicators for a person. These additional indicators may include "simple" attributes, such as whether a connected friend "liked" the person's company or the person's action (e.g., via a posting on social media). These additional indicators may include "advanced" attributes obtained by performing a deeper analysis of attribute relationships between well-being profiles. For example, the importance of an attribute may be scored across multiple well-being profiles within the scope of a particular context in order to deduce the influence or impact on the individual in question. The more information available (e.g., attributes, relationships and keywords) and captured within as many well-being profiles as possible, the richer the quality of information defining well-being qualities across the group. This may then be applied in a more assertive fashion when wanting to classify further traits regarding an individual whose well-being profile is less known. Further details regarding building the well-being profile will be discussed herein with reference to FIGS. 4A-4C.

Figure 4A:
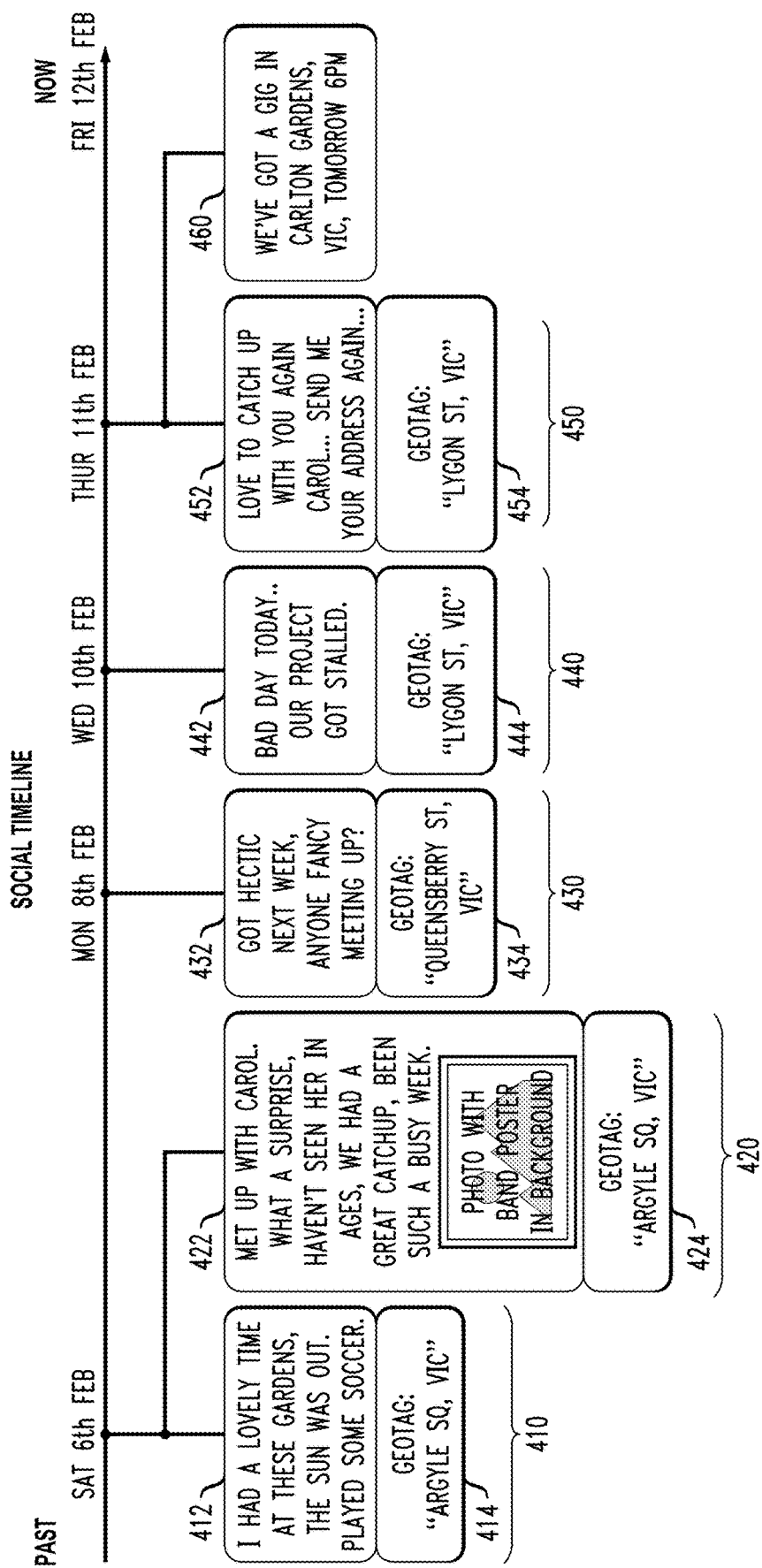
FIGS. 4A-4C depict diagrams illustrating a use case scenario for building a well-being profile for a given user, according to an embodiment of the present invention.
Figure 4B:
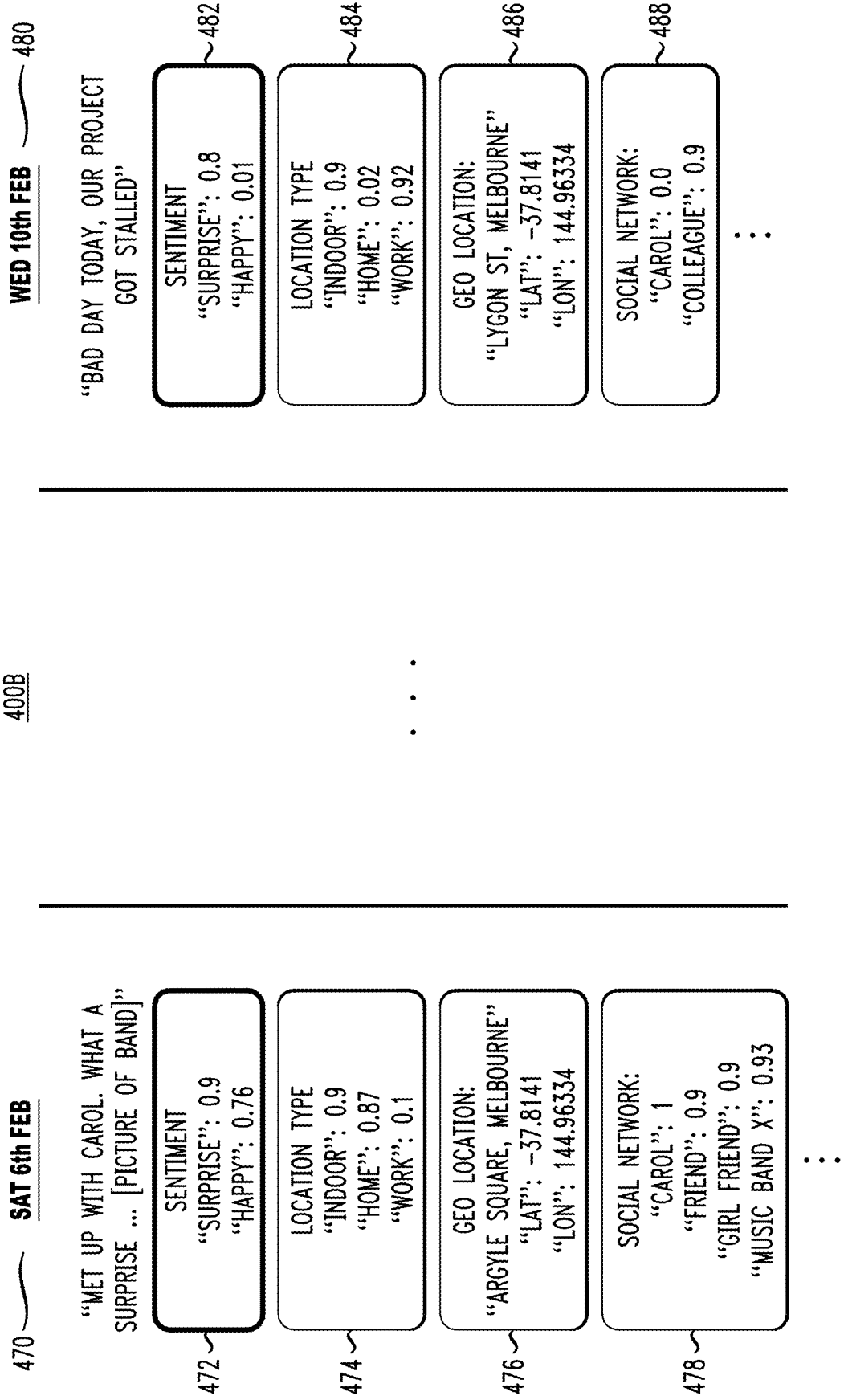
Figure 4C:
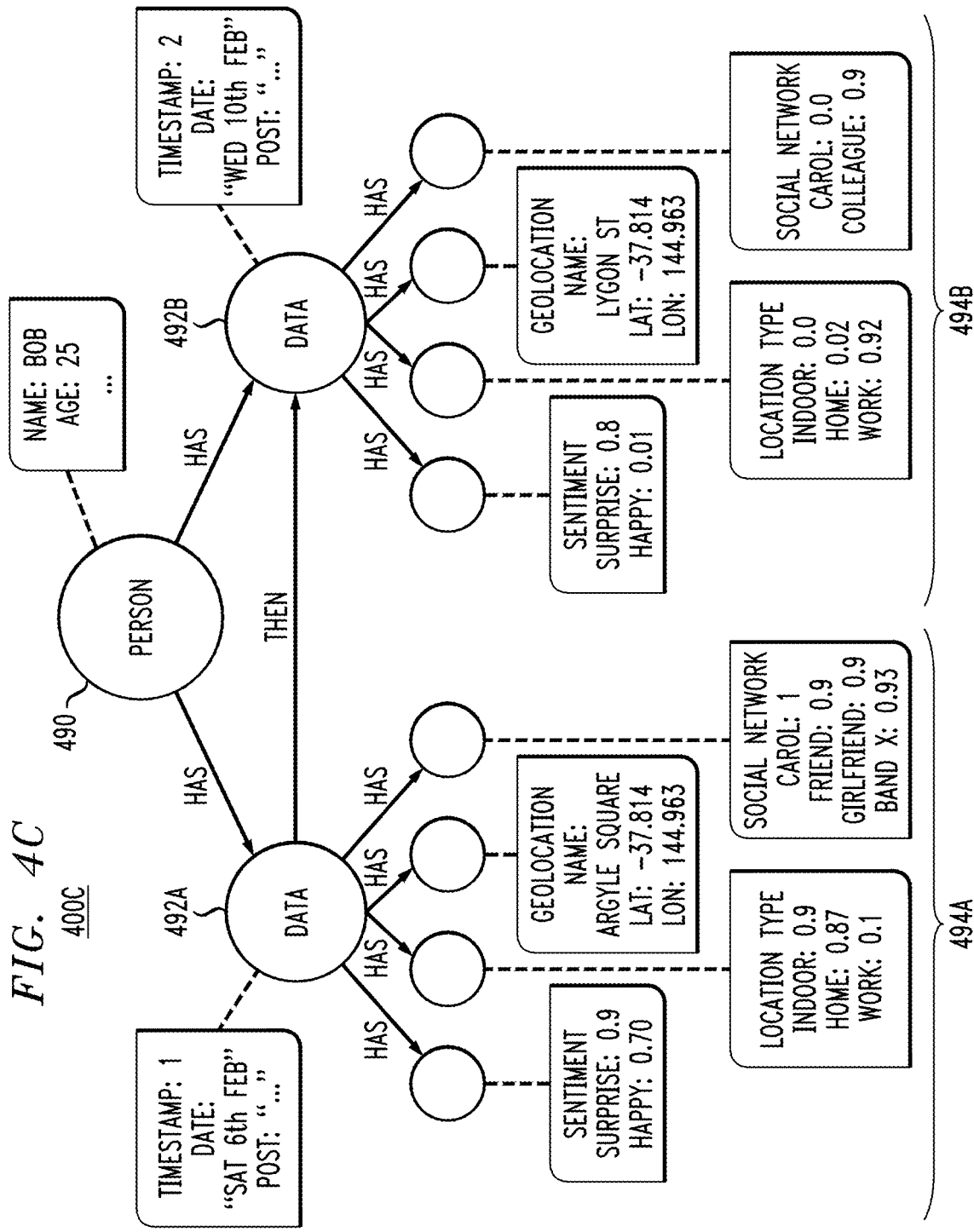

FIGS. 4A-4C are provided to illustrate a use case scenario for building a well-being profile for a given user. FIG. 4A depicts an exemplary social timeline 400A associated with a timeline extract of social network activity 410-460 corresponding to a user named Bob. For example, activity 410-460 may be obtained from one or more social media networks, such as Facebook®, Twitter®, etc.

On February 6, Bob posted activity 410 and activity 420. As shown, activity 410 comprises post 412 and geotag 414. Post 412 includes a message that says "I had a lovely time at these gardens, the sun was out. Played some soccer." Geotag 414 is associated with Bob's location at the time post 412 was posted, and indicates that Bob was at Argyle Square. Activity 420 comprises post 422 and geotag 424. Post 422 includes text that says "Met up with Carol. What a surprise, haven't seen her in ages. We had a great catchup, been such a busy week." Post 422 is also shown including a photo. For example, the photo may include an image of a poster of a band (hereinafter referred to as Music Band X) in the background. Geotag 424 is associated with Bob's location at the time post 422 was posted, and indicates that Bob was at Argyle Square.

On February 8, Bob posted activity 430. As shown, activity 430 comprises post 432 and geotag 434. Post 432 includes text that says "Got hectic next week, anyone fancy meeting up?" Geotag 434 is associated with Bob's location at the time post 432 was posted, and indicates that Bob was at Queensberry Street.

On February 10, Bob posted activity 440. As shown, activity 440 comprises post 442 and geotag 444. Post 442 includes text that says "Bad day today . . . our project got stalled." Geotag 444 is associated with Bob's location at the time post 442 was posted, and indicates that Bob was at Lygon Street.

On February 11, Bob posted activity 450. As shown, activity 450 comprises post 452 and geotag 454. Post 452 includes text that says "Love to catch up with you again Carol . . . send me your address again . . . " Geotag 454 is associated with Bob's location at the time post 452 was posted, and indicates that Bob was at Lygon Street. Also on February 11, activity 460 was posted. In this illustrative example, activity 460 was posted by Music Band X. Activity 460 includes a post that includes text saying "We've got a gig in Carlton Gardens, VIC, tomorrow 6 pm." That is, Music Band X indicated on a social media platform that they would be performing on February 12.

FIG. 4B depicts diagram 400B illustrating a summary of potential indicators determined by the extraction of features from the exemplary social timeline depicted in FIG. 4A. Column 470 corresponds to an analysis performed on features associated with activity 420 from FIG. 4A. As shown, the exemplary feature analysis of activity 420 yields sentiment analysis 472, location type analysis 474, geolocation analysis 476 and social network analysis 478. In this illustrative example, sentiment analysis 472 comprises data indicating a confidence score for "surprise" of 0.9 and a confidence score for "happy" of 0.76. That is, the sentiment analysis performed on activity 420 has determined a high likelihood of surprise and a somewhat high likelihood of happiness associated with the content of activity 420. In this illustrative example, location type analysis 474 comprises data indicating a confidence score for "indoor" of 0.9, a confidence score for "home" of 0.87, and a confidence score for "work" of 0.1. That is, the location type analysis performed on activity 420 has determined a high likelihood that activity 420 is associated with an indoor location, with home being a highly likely location and work being a highly unlikely location. In this illustrative example, geolocation analysis 476 comprises data indicating that Bob shared activity 420 at "Argyle Square, Melbourne." That is, the geolocation analysis on activity 420 has determined the location from which Bob shared activity 420. Additionally, geolocation analysis 476 may provide more precise geolocation data by providing coordinate data indicating the latitude and longitude. As shown, the coordinates associated with activity 420 are (−37.8141, 144.96334). In this illustrative example, social network analysis 478 comprises data indicating a confidence score for "Carol" of 1, "Friend" of 0.9, "Girlfriend" of 0.9, and "Music Band X" of 0.93. That is, the social network analysis performed on activity 420 has determined that Carol is a person within Bob's social network that is the subject of activity 420 (who may be his friend or girlfriend), and that Music Band X is also likely within Bob's social network (based on the picture of the band).

Column 480 corresponds to an analysis performed on features associated with activity 440 from FIG. 4A. As shown, the exemplary feature analysis of activity 440 yields sentiment analysis 482, location type analysis 484, geolocation analysis 486 and social network analysis 488. In this illustrative example, sentiment analysis 482 comprises data indicating a confidence score for "surprise" of 0.8 and a confidence score for "happy" of 0.01. That is, the sentiment analysis performed on activity 440 has determined a high likelihood of surprise and a low likelihood of happiness associated with the content of activity 440. In this illustrative example, location type analysis 484 comprises data indicating a confidence score for "indoor" of 0.9, a confidence score for "home" of 0.02, and a confidence score for "work" of 0.92. That is, the location type analysis performed on activity 440 has determined a high likelihood that activity 440 is associated with an indoor location, with home being a highly unlikely location and work being a highly likely location. In this illustrative example, geolocation analysis 486 comprises data indicating that Bob shared activity 440 at "Lygon St., Melbourne." That is, the geolocation analysis on activity 440 has determined the location from which Bob shared activity 440. Additionally, geolocation analysis 486 may provide more precise geolocation data by providing coordinate data indicating the latitude and longitude. As shown, the coordinates associated with activity 440 are (−37.8141, 144.96334). In this illustrative example, social network analysis 488 comprises data indicating a confidence score for "Carol" of 0.0 and "Colleague" of 0.9. That is, the social network analysis performed on activity 440 has determined that Carol is not the subject of activity 440, and that the subject is likely a work colleague of Bob.

As shown in FIGS. 4A and 4B, social media data from various social networks where Bob is active is ingested and analyzed to identify appropriate indicators for inclusion in a well-being profile for Bob. The identified indicators are aggregated and stored in an appropriate data structure for later queries or updates as new relevant data from Bob's social network is ingested. FIG. 4C depicts an exemplary network graph representation 400C of a well-being profile, according to an embodiment of the present invention. Network graph representation 400C is shown having person node 490, data nodes 492A and 492B, indicator nodes 494A and indicator nodes 494B. In this illustrative example, person node 490 corresponds to Bob, data node 492A corresponds to activity 420 from FIG. 4A, data node 492B corresponds to activity 440 from FIG. 4A, indicator nodes 494A correspond to the indicators determined by the analysis of activity 420 as described in FIG. 4B, and indicator nodes 494B correspond to the indicators determined by the analysis of activity 440 as described in FIG. 4B.

In one embodiment, one or more other nodes of the graph may be added to represent other entities (e.g., friends, family, co-workers), with edges representing the relationships between people. Attributes on each of these others node may further enhance the data, detailing information such as dates/timestamps when people met, events occurred, tying information to data located in other network graphs, etc.

Because social network data spans real-time, any captured data representing an action, event or other, typically has an associated timestamp. This means that at any time an item can be referenced based on its temporal occurrence. As shown in network graph representation 400C, Person Bob <HAS> a "Data" entry for Saturday <THEN> on another day <HAS> more "Data". Each "Data" node/vertex <HAS> associated indicators, such as "Sentiment", "Geolocation", etc.

By using a graph traversal algorithm tailored for analyzing well-being attributes, such as mental health attributes, particular data associated with a person (e.g., temporal data, relationship data, etc.) may be extracted by visiting nodes on a graph along associated edges. For example, attributes that may be analyzed and/or extracted could be, but are not limited to, geospatial location of information and time of year. The geospatial location of information may be used to identify geospatial areas that may be of influence to a person's well-being (e.g., mental well-being). The time of year of information may be used to identify if a seasonal disorder is of influence to a person's well-being (e.g., mental well-being). These attributes may then be used as input to other systems to better tailor information that influences the well-being for that person (e.g., influences on the mood or mental state).

For example, a graph traversal algorithm could find and analyze the way a social media posting is written, such as by phrasing, words used, etc. Through sentiment analysis, machine learning, etc., it may then be determined whether the person appears happy/sad/etc., and whether there is a correlation with geospatial location, time of the year, etc. The graph traversal algorithm may be extended to analyze image content (e.g., items within the image, relevant text within the image, and associated people within the image).

The data representation of "well-being" profile states may be stored in a data store. In one embodiment, the data store is a graph database. Because each entry incorporates a timestamp, the data store may be queried to create a temporal representation. Each data representation of well-being profile states may comprise metadata. For example, the metadata may include metadata pointing to key information that contributed to the identification and determination of the state of the well-being profile.

Figure 5:
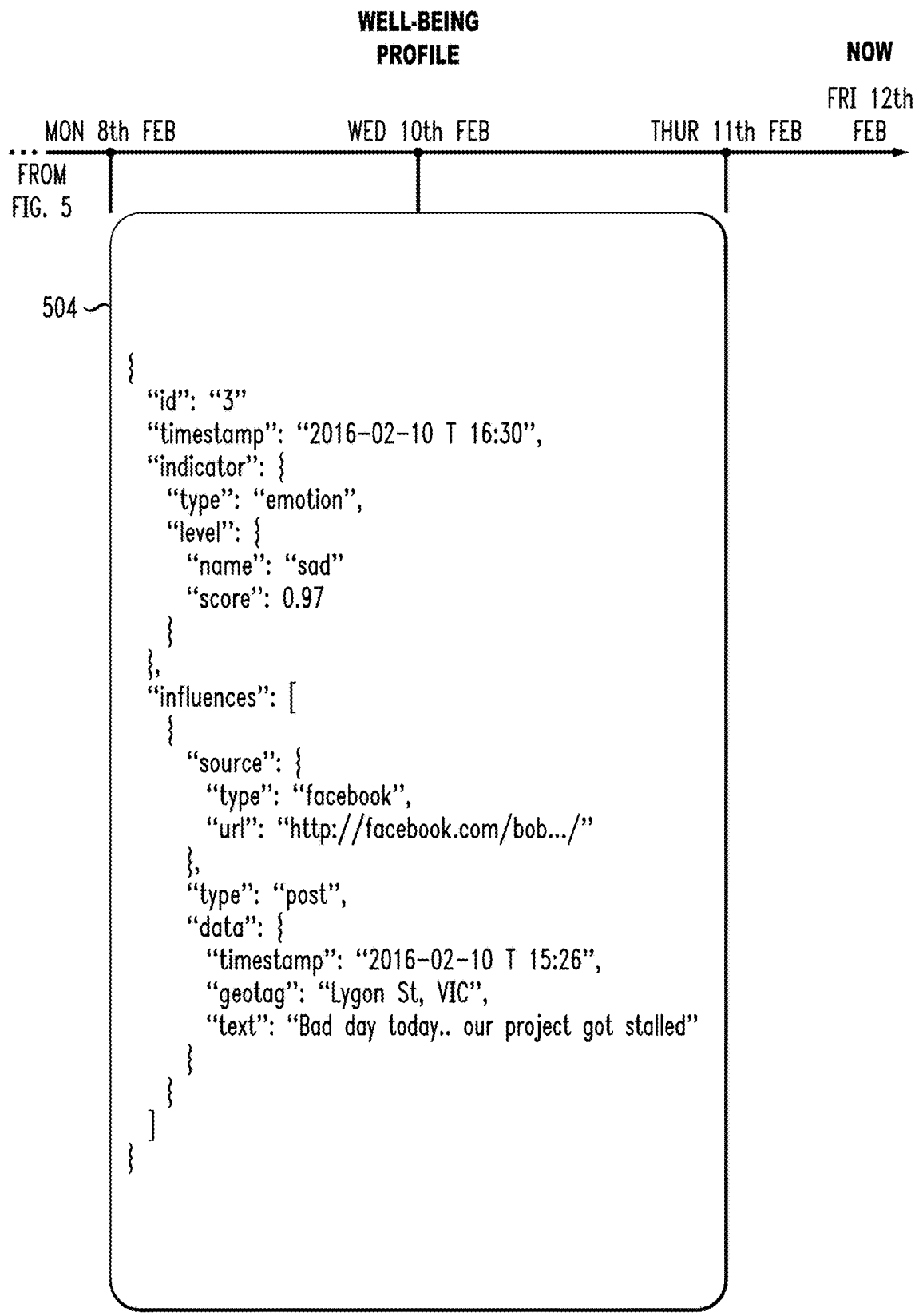
FIG. 5 depicts an exemplary representation of a well-being profile, according to an embodiment of the present invention.

FIG. 5 is provided to illustrate an exemplary representation of a well-being profile 500 associated with the use case described in FIGS. 4A-4C. As shown, well-being profile 500 is depicted in the form of data representation visualization. Representation 502 corresponds to activity 420 from FIG. 4A, and representation 504 corresponds to activity 440 from FIG. 4A.

Figure 6:
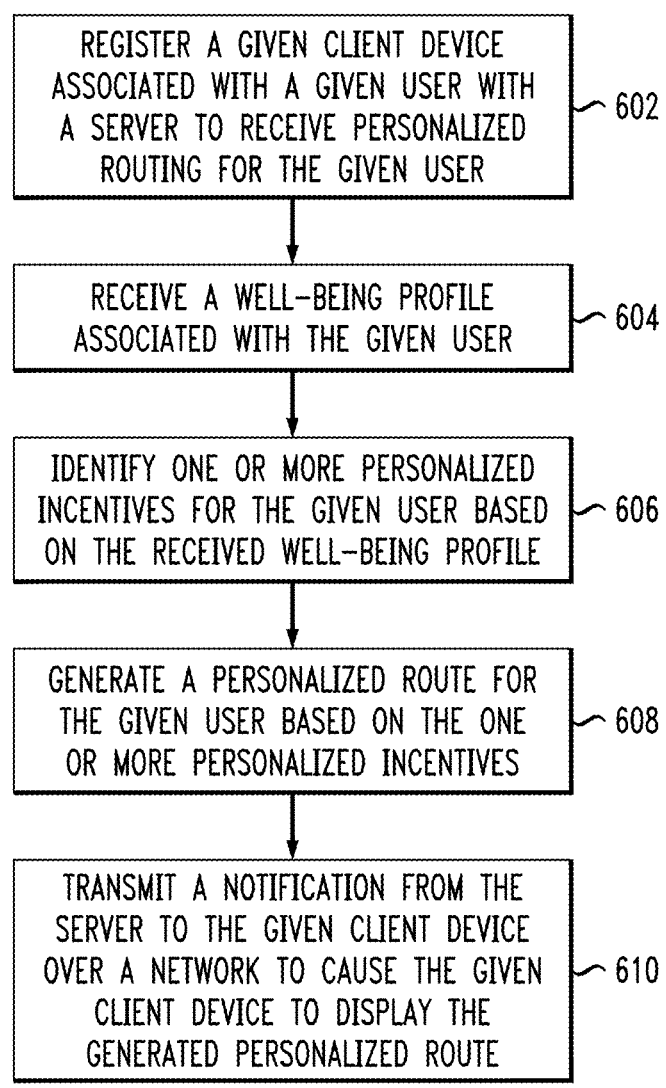
FIG. 6 depicts a flowchart illustrating an exemplary process for generating a personalized route for a given user based on a well-being profile, according to an embodiment of the present invention

With reference to FIG. 6, flow chart 600 is provided illustrating a process for generating personalized routes to improve the well-being of a given user based on a well-being profile, according to an embodiment of the present invention. In one embodiment, at step 602, a given client device associated with a given user is registered with a server to receive personalized routing for the given user. At step 604, a well-being profile associated with the given user is received. At step 606, one or more personalized incentives are identified for the given user based on the received well-being profile. At step 608, a personalized route for the given user is generated based on the one or more personalized incentives. In one embodiment, generating the personalized route comprises modifying a current route associated with the given user. For example, if a current route has the given user travelling from point A to point B, the current route may be modified to include one or more intermediate "stops" designed to increase the well-being of the given user during the trip from point A to point B. At step 610, a notification is transmitted from the server to the given client device over a network to cause the given client device to display the generated personalized route. In one embodiment, the transmission automatically causes the display of the generated personalized route on the client device. In an alternative embodiment, the transmission creates a prompt for the given user to either select the generated personalized route. Such a prompt may include an option to continue travelling on a current route.

Figure 7A:
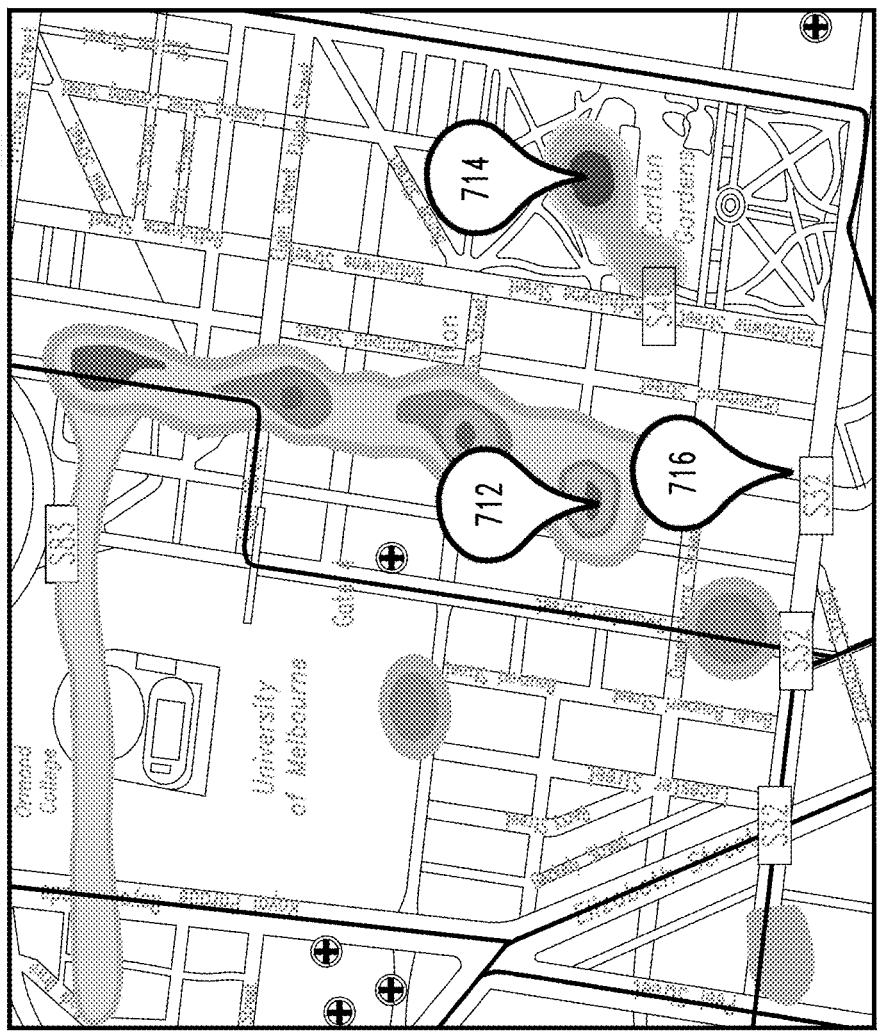
FIG. 7A depicts a diagram illustrating an exemplary representation of a well-being profile, according to an embodiment, of the present invention.
Figure 7B:
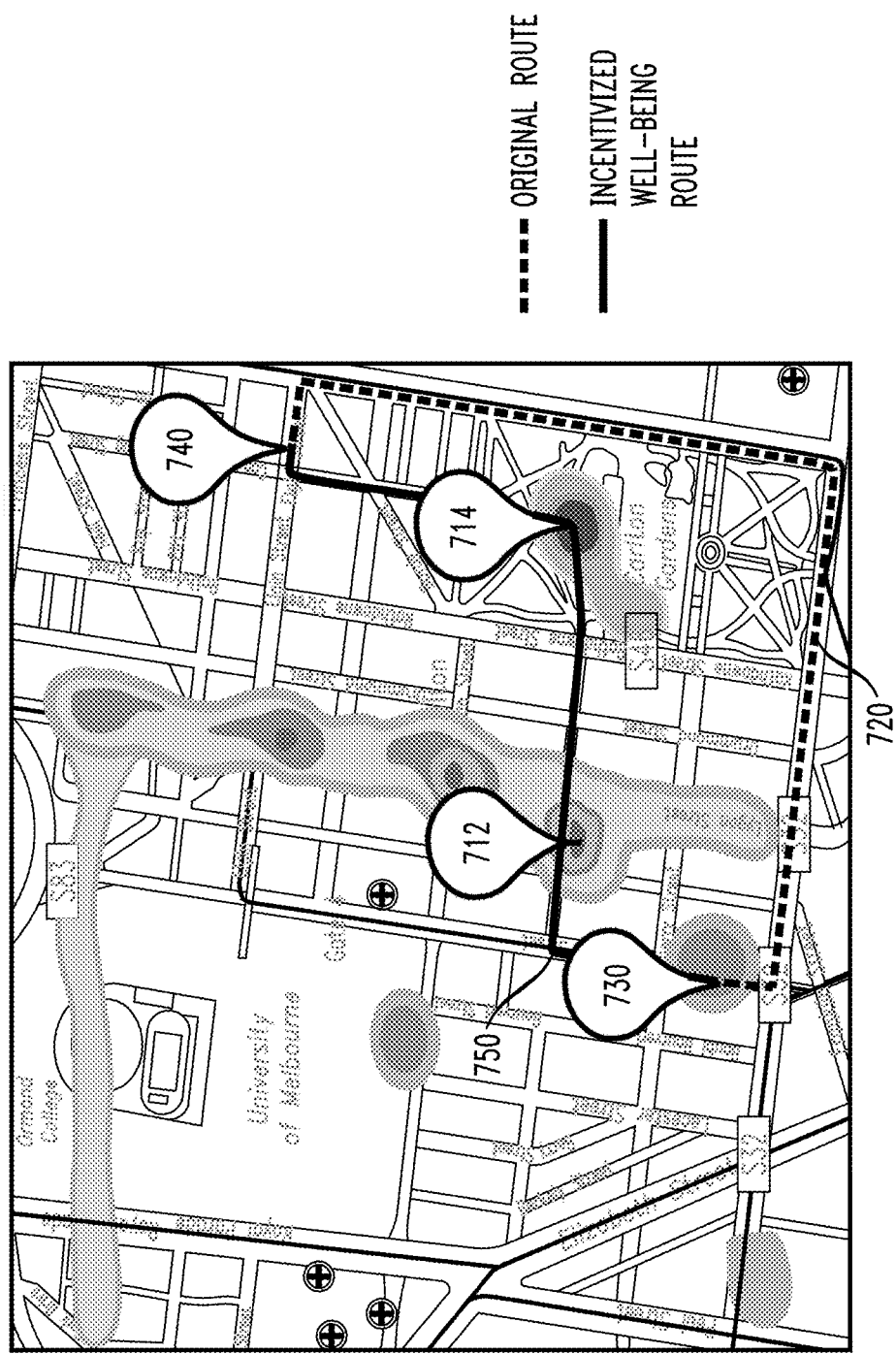
FIG. 7B depicts a diagram illustrating a use case scenario for generating personalized routes to improve the well-being of a given user, according to an embodiment of the present invention.

FIGS. 7A and 7B are provided to illustrate a use case scenario for generating a personalized route to improve the well-being of a given user. FIG. 7A depicts an exemplary heat map visualization 700A of the well-being profile created for Bob based on the social network activity associated with social timeline 400 from FIG. 4A. Visualization 700A is shown overlaying a map comprising locations associated with the well-being profile. For example, pins 712-716 each represent locations associated with Bob's well-being as determined from Bob's well-being profile. For example, pin 712 may be a favorite location for Bob to have coffee. For example, Bob may have previously recommended that particular coffee shop to some friends on his social network, based upon receiving a previous free coffee incentive. This may have made Bob eligible for a free pastry incentive from the coffee shop. Pin 714 may represent a location of where Music Band X is playing. The location represented by pin 714 may be determined based on, for example, a social media posting made by the band. The location associated with pin 714 is a "hotspot" on the visualization because the system identified an image of the band present in the photo in Bob's photo. Additionally, pin 716 may represent a location associated with a detriment to Bob's well-being, such as a high stress location (e.g., work).

Bob would like to travel from work to visit a friend Carol in a nearby suburb. Bob is unsure of a good route, and uses the system to recommend potential routes. The system takes Bob's well-being profile as input, as well as other possible inputs (e.g., locality specific data), and uses the inputs to rank the proposed routes. The most highly ranked proposed route takes into consideration both proposed incentives and the well-being profile.

FIG. 7B depicts an exemplary map 700B illustrating the generation of a personalized route. In this exemplary embodiment, for the sake of clarity, map 700B is shown layered on heat map visualization 700A. Map 700B includes current route 720 depicting a route currently being followed by Bob to travel from point 730 to point 740. For example, point A 730 may be Bob's home, and point B 740 may be his friend Carol's home in a nearby suburb. As shown in this example, current route 720 does not directly pass through "hot spot" regions indicated as being relevant based on Bob's social network activity, such as pins 712 and 714.

Bob, who may have previously registered with the cloud-based incentive server 104 to received personalized routing via one or more devices (e.g., a smartphone), may receive a notification from a cloud-based incentive server about the existence of a personalized route based on the well-being profile for Bob. The personalized route may be a modified version of original route 720 determined to increase the well-being for Bob based on the well-being profile for Bob. For example, the personalized route may be a route that maximizes Bob's well-being by including locations that benefit Bob's well-being.

As shown in FIG. 7B, personalized route 750 is depicted as a route proposed to maximize Bob's well-being during his trip from point A 730 to point B 740. In other embodiments, an entire route need not be shown. For example, the issued notification may only provide information regarding one or more detours, relative to current route 720, for collecting one or more well-being incentives. In some embodiments, the notification may cause a pop-up display or other device notification indicating the availability, for viewing and/or download, of incentives or incentivized personalized routes. In one embodiment, Bob is notified of personalized route 750 and is given the option of accepting or rejecting personalized route 750. In an alternative embodiment, personalized route 750 is configured to automatically override current route 720.

Personalized route 750 is shown intersecting with pin 712 and pin 714. That is, pins 712 and 714 may each represent an intermediate stop designed to provide an improvement to Bob's well-being. For example, as discussed above, pin 712 may be Bob's favorite coffee shop, and pin 714 may be a park where live music is being performed by Music Band X. Thus, intermediate stops indicated by pins 712 and 714 may improve Bob's well-being by modifying current route 720 to include experiences that he may not have otherwise had. While at the intermediate stops indicated by pins 712 and 714, Bob may decide to upload one or more postings to one or more of his social networks sharing his experience. In one embodiment, the uploaded postings may then be used to further update (e.g., refine or improve) Bob's existing well-being profile. For example, if Bob had a bad time at the concert in the park associated with pin 714, Bob's existing well-being profile may be updated to reflect dislike toward Music Band X.

The embodiments described above may be extended to a group scenario. Routes may be generated that serve to aggregate a group of people to meet along the route, with the aim of improving the well-being of each individual and/or the group as a whole. In one embodiment, multiple profiles may be utilized to improve the well-being of a given user and/or a group of users by proposing routes that intersect for the group of users. For example, if a group of friends have not seen each other for a long time, the profiles of each friend may be used to improve the well-being of the group by facilitating a meeting place and/or one or more places to redeem incentives.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
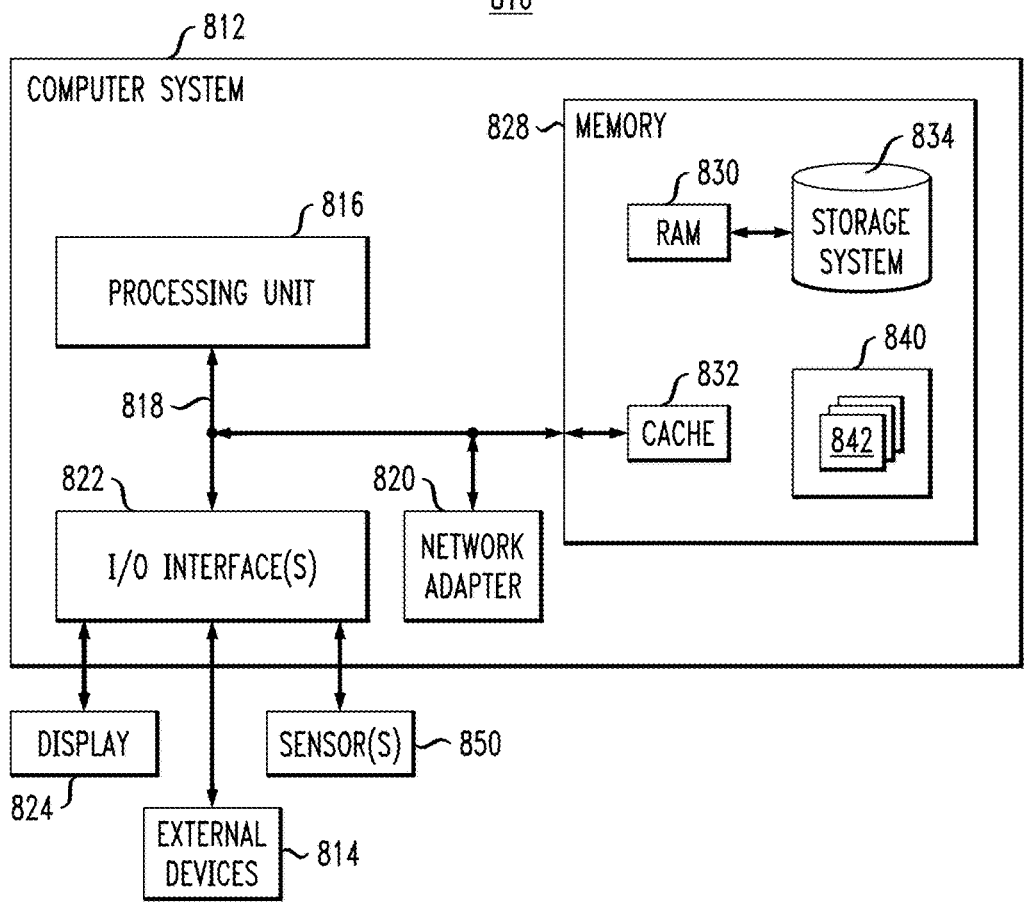
FIG. 8 depicts a computer system in accordance with which one or more components/steps of techniques of the invention may be implemented, according to an embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or another optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
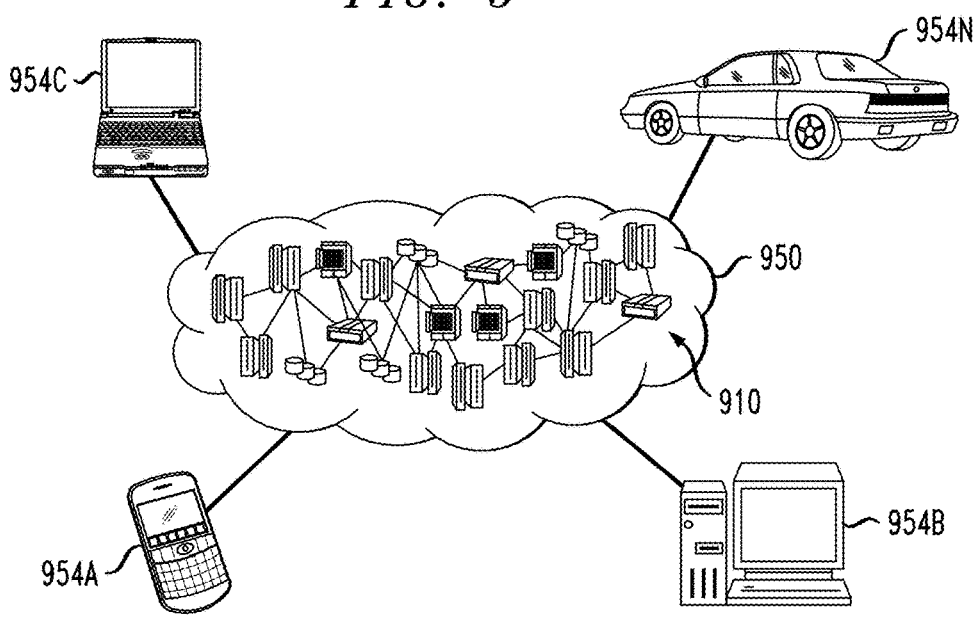
FIG. 9 depicts a cloud computing environment, according to an embodiment of the present invention.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
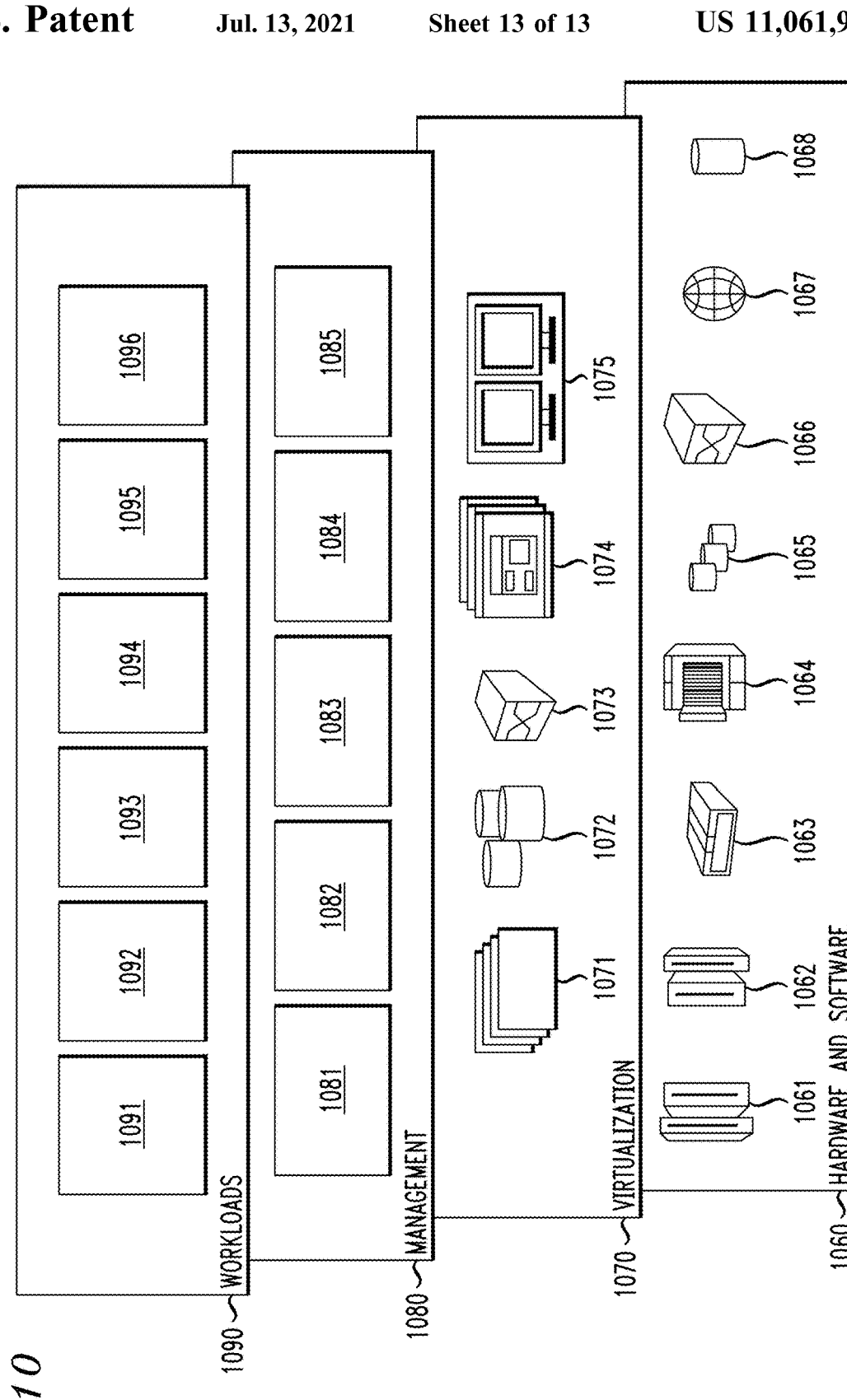
FIG. 10 depicts abstraction model layers, according to an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and personalized routing and incentives processing 1096, which may perform one or more of the functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
    building a well-being profile for a given user based on data obtained from one or more sources associated with the given user and one or more other users associated with the given user; wherein building the well-being profile comprises:
        obtaining social media data from at least one social media network associated with the given user and the one or more other users associated with the given user, wherein the obtained social media data comprises timestamp data, geolocation data and content data,
        analyzing features of the social media data comprising a sentiment, a location, a geolocation and a social network, and calculating a confidence score for data associated with each of the sentiment, location, and social network of the social media data to determine patterns the given user based on the social media data of the given user and the one or more other users associated with the given user, wherein the patterns comprise transportation patterns, purchase patterns and public event patterns;
    identifying one or more personalized incentives organized into a hierarchy of multiple incentive levels in a database for the given user based on the well-being profile, wherein identifying the one or more personalized incentives comprises selecting the one or more personalized incentives for the given user by matching an incentive level of the given user to an incentive level in the hierarchy;
    generating a personalized route based on the one or more identified personalized incentives, wherein generating the personalized route comprises modifying a current route associated with the given user to include one or more intermediate stops designed to improve a well-being of the given user; and
    transmitting a notification to a given client device associated with the given user over a network, wherein the notification causes the given client device to display the personalized route;
    wherein the steps are implemented by at least one processing device comprising a processor operatively coupled to memory.

2. The method of claim 1, wherein building the well-being profile further comprises obtaining sensor data via one or more devices.

3. The method of claim 2, wherein the one or more devices comprise one or more wearable devices.

4. The method of claim 1, wherein building the well-being profile further comprises obtaining location data associated with the user.

5. The method of claim 1, wherein building the well-being profile further comprises obtaining communication service data.

6. The method of claim 1, wherein building the well-being profile comprises creating a graph network of actions of the given user and other ones of the plurality of users based on data obtained from mining the one or more social networks of the given user.

7. The method of claim 6, wherein identifying the patterns for the given user comprises traversing the graph network using one or more graph algorithms.

8. The method of claim 1, wherein identifying the patterns for the given user comprises utilizing cognitive learning algorithms.

9. The method of claim 1, further comprising registering the given client device with a server to receive personalized routing for the given user.

10. The method of claim 1, wherein the one or more personalized incentives comprise a coupon, deal, or reward for visiting a business at a location close to or on personalized route.

11. A computer program product comprising a computer readable storage medium for storing computer readable program code which, when executed, causes a computer to perform the steps of:
building a well-being profile for a given user based on data obtained from one or more sources associated with the given user and one or more other users associated with the given user, wherein building the well-being profile comprises:
obtaining social media data from at least one social media network associated with the given user and the one or more other users associated with the given user, wherein the obtained social media data comprises timestamp data, geolocation data and content data,
analyzing features of the social media data comprising a sentiment, a location, a geolocation and a social network, and calculating a confidence score for data associated with each of the sentiment, location, and a social network of the social media data to determine patterns of the given user based on the social media data of the given user and the one or more other users associated with the given user, wherein the patterns comprise transportation patterns, purchase patterns and public event patterns;
identifying one or more personalized incentives organized into a hierarchy of multiple incentive levels in a database for the given user based on the well-being profile, wherein identifying the one or more personalized incentives comprises selecting the one or more personalized incentives for the given user by matching an incentive level of the given user to an incentive level in the hierarchy;
generating a personalized route based on the one or more identified personalized incentives, wherein generating the personalized route comprises modifying a current route associated with the given user to include one or more intermediate stops designed to improve a well-being of the given user; and
transmitting a notification to a given client device associated with the given user over a network, wherein the notification causes the given client device to display the personalized route.

12. The computer program product of claim 11, wherein the one or more personalized incentives comprise a coupon, deal, or reward for visiting a business at a location close to or on personalized route.

13. An apparatus comprising:
a processing device comprising a processor coupled to a memory;
the processing device being configured to:
build a well-being profile for a given user based on data obtained from one or more sources associated with the given user and one or more other users associated with the given user, wherein building the well-being profile comprises:
obtaining social media data from at least one social media network associated with the given user and the one or more other users associated with the given user, wherein the obtained social media data comprises timestamp data, geolocation data and content data,
analyzing features of the social media data comprising a sentiment, a location, a geolocation and a social network, and calculating a confidence score for data associated with each of the sentiment, location, and social network of the social media data to determine patterns of the given user based on the social media data of the given user and the one or more other users associated with the given user, wherein the patterns comprise transportation patterns, purchase patterns and public event patterns;
identify one or more personalized incentives organized into a hierarchy of multiple incentive levels in a database for the given user based on the well-being profile, wherein identifying the one or more personalized incentives comprises selecting the one or more personalized incentives for the given user by matching an incentive level of the given user to an incentive level in the hierarchy;
generate a personalized route based on the one or more identified personalized incentives, wherein generating the personalized route comprises modifying a current route associated with the given user to include one or more intermediate stops designed to improve a well-being of the given user; and
transmit a notification to a given client device associated with the given user over a network, wherein the notification causes the given client device to display the personalized route.

14. The apparatus of claim 13, wherein the building of the well-being profile further comprises obtaining data selected from the group consisting of: sensor data via one or more devices, location data associated with the user, and communication service data.

15. The apparatus of claim 14, wherein the one or more devices comprise one or more wearable devices.

16. The apparatus of claim 13, wherein building the well-being profile comprises creating a graph network of actions of the given user and other ones of the plurality of users based on data obtained from mining the one or more social networks of the given user.

17. The apparatus of claim 16, wherein identifying the patterns for the given user comprises a traversal of the graph network using one or more graph algorithms.

18. The apparatus of claim 13, wherein identifying the patterns for the given user comprises a utilization of cognitive learning algorithms.

19. The apparatus of claim 13, wherein the processing device implements a cloud-based server.

20. The apparatus of claim 19, wherein the given client device comprises a mobile client device and the cloud-based server is configured to communicate with the mobile client device over one or more wireless channels.

\* \* \* \* \*